(12) United States Patent
Holben

(10) Patent No.: US 6,450,446 B1
(45) Date of Patent: Sep. 17, 2002

(54) COUNTER ROTATING CIRCULAR WING FOR AIRCRAFT

(76) Inventor: Bill Holben, Rte. 2 173AB, Clarksville, AR (US) 72830

( * ) Notice: Subject to any disclaimer, the term of this patent is extended or adjusted under 35 U.S.C. 154(b) by 0 days.

(21) Appl. No.: 09/875,391

(22) Filed: Jun. 5, 2001

(51) Int. Cl.[7] .......................... B64C 27/22; B64C 39/66; B64C 29/00
(52) U.S. Cl. ...................... 244/34 A; 244/6; 244/7 A; 244/12.2; 244/23 C; 244/17.23
(58) Field of Search .................. 244/6, 7 A, 8, 244/7 R, 10, 12.2, 17.11, 23 C, 34 A, 67, 73 B, 17.23, 73 C

(56) References Cited

U.S. PATENT DOCUMENTS

| | | | |
|---|---|---|---|
| 1,147,294 A | * | 7/1915 | Beurrier et al. |
| 1,738,611 A | | 12/1929 | Rasmussen |
| 2,402,957 A | | 7/1946 | Geddes |
| 2,464,285 A | * | 3/1949 | Andrews |
| 3,104,853 A | * | 9/1963 | Klein |
| 3,288,396 A | | 11/1966 | Gouin |
| 3,572,613 A | * | 3/1971 | Porter |
| 5,035,377 A | * | 7/1991 | Buchelt |
| 5,318,248 A | * | 6/1994 | Zielonka |
| 5,328,131 A | | 7/1994 | Fodera et al. |
| 5,407,150 A | * | 4/1995 | Sadleir |
| 5,503,351 A | | 4/1996 | Vass |
| 5,746,390 A | * | 5/1998 | Chiappetta |

FOREIGN PATENT DOCUMENTS

| | | |
|---|---|---|
| FR | 420590 | 2/1911 |
| FR | 566440 | 2/1924 |

OTHER PUBLICATIONS

Flight, vol LXII, Issue No. 2284 p. 568, Pub. Oct. 31, 1952.

* cited by examiner

Primary Examiner—Peter M. Poon
Assistant Examiner—Tien Dinh
(74) Attorney, Agent, or Firm—Trojan Law Office

(57) ABSTRACT

The present invention herein is a disc shaped wing comprised two disc segments, an inner disc assembly and an outer disc assembly, that counter-rotate to enable vertical take off and landing. The inner disc assembly has a plurality of flap blades that open to provide lift during take off and landing and close to provide a substantially contiguous surface during horizontal flight. The outer disc assembly has a plurality of lower blades that contain retractable blades. During take off and landing the retractable blades extend to provide added lift and stability. The wing shape and counter-rotation also imparts greater stability and lift for horizontal flight.

15 Claims, 4 Drawing Sheets

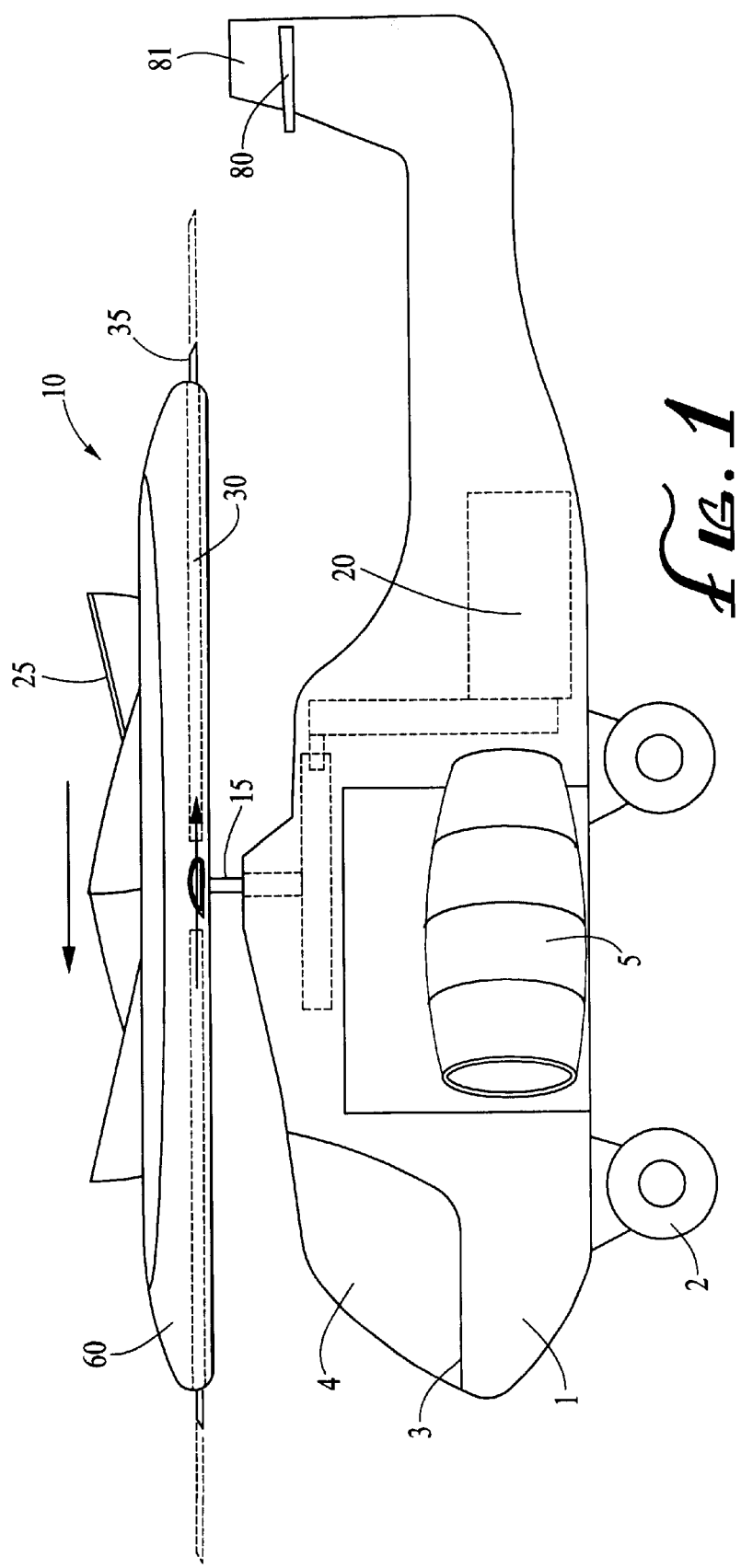

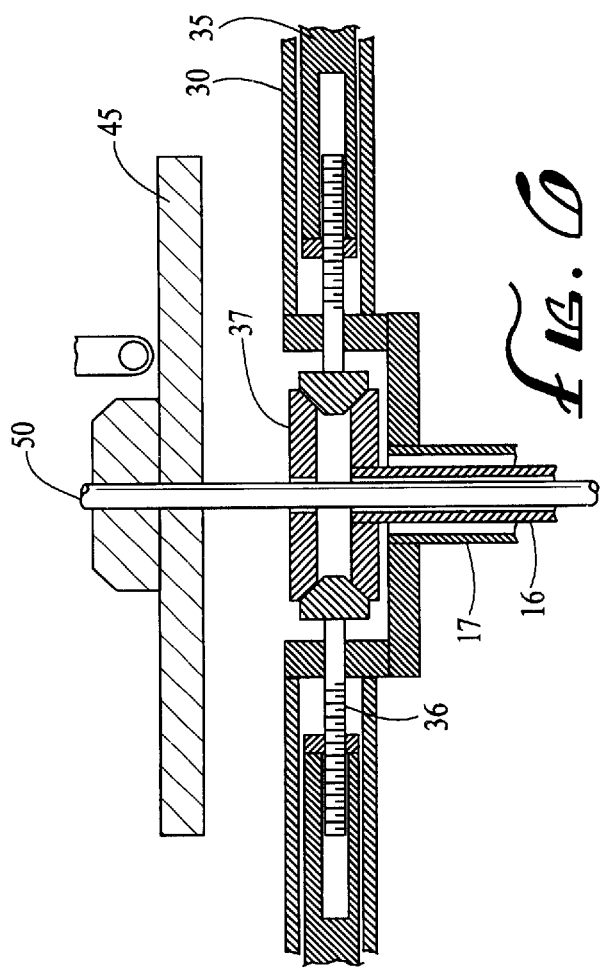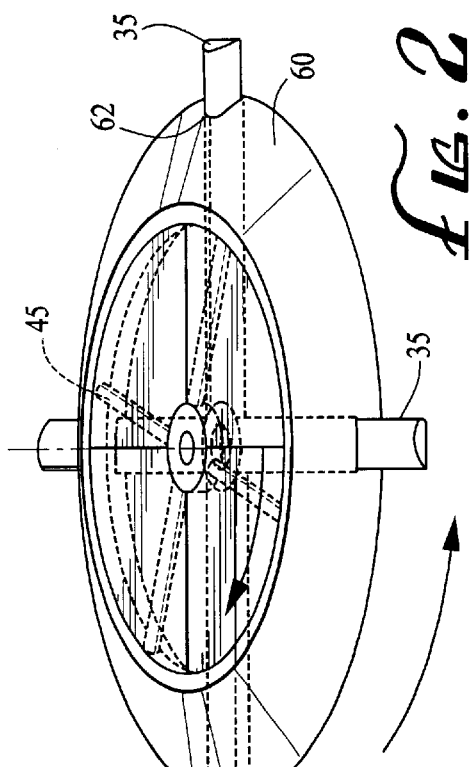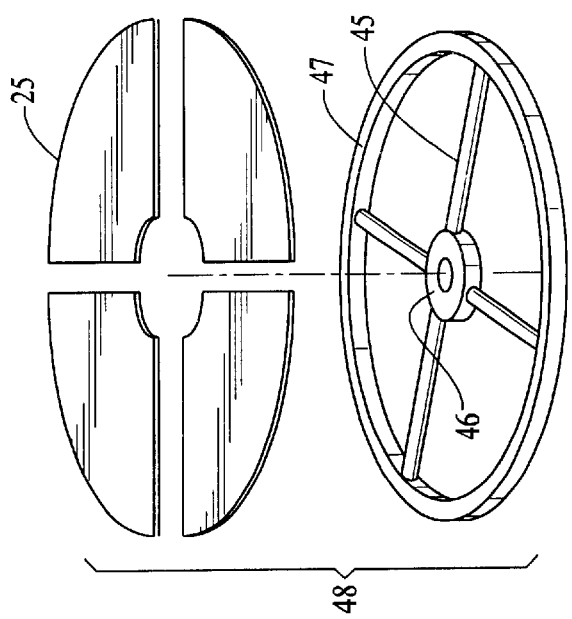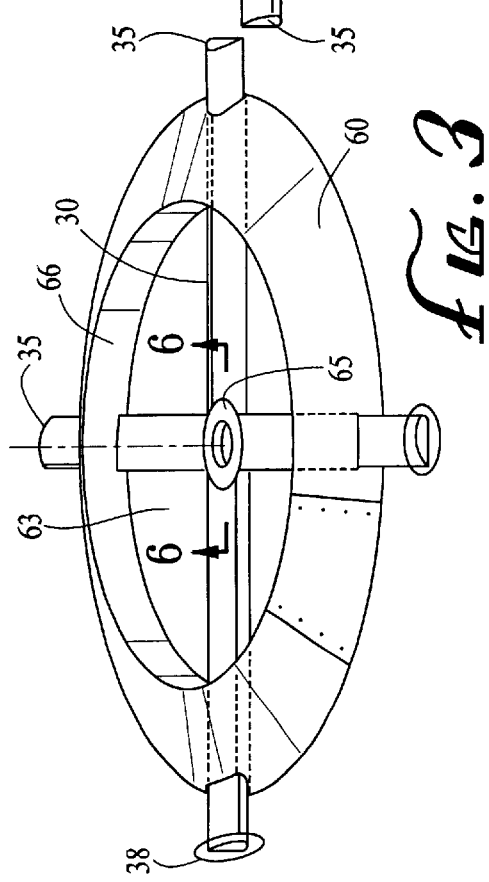

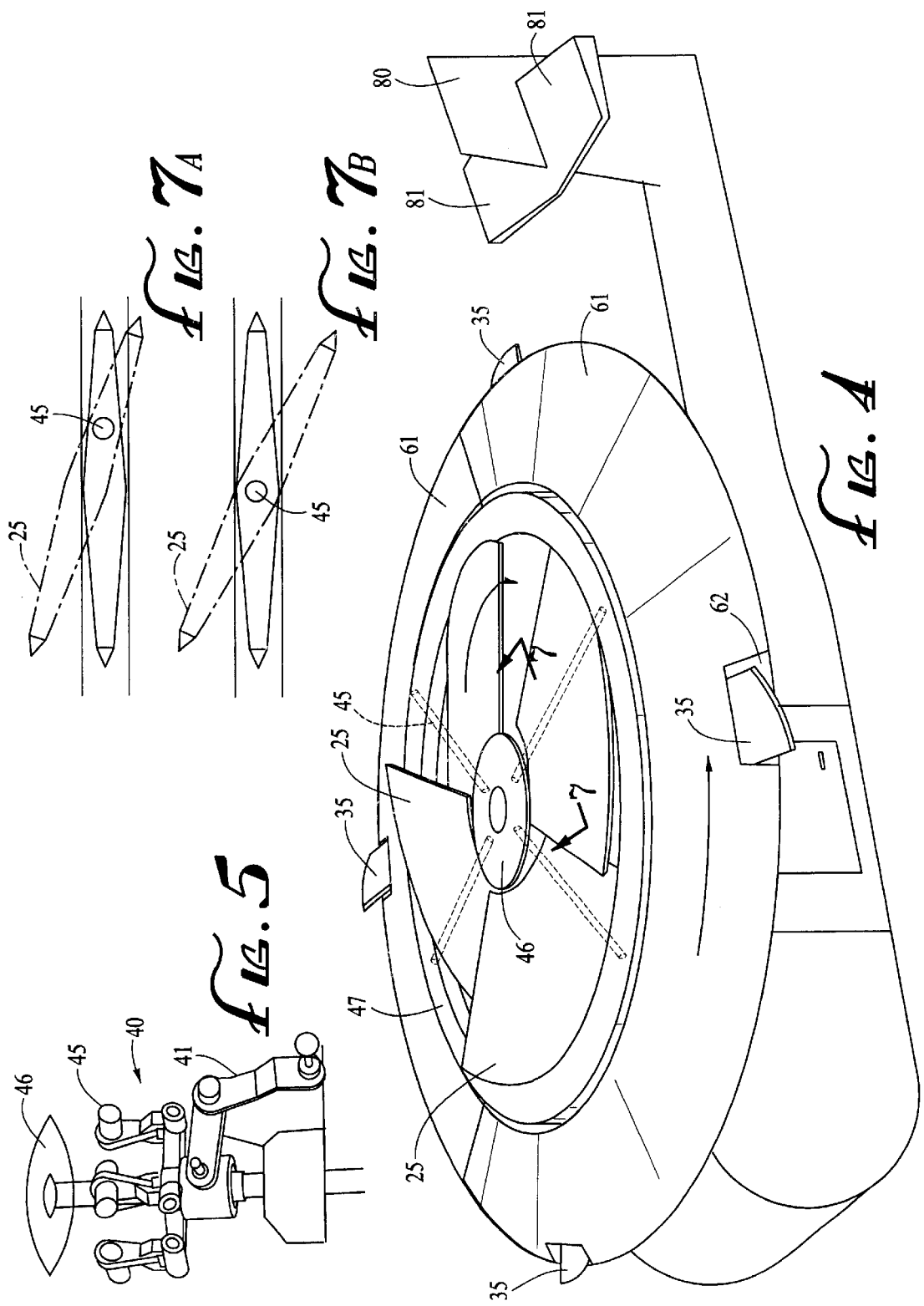

COUNTER ROTATING CIRCULAR WING FOR AIRCRAFT

BACKGROUND OF THE INVENTION

The first recorded vertical take-off and landing device is attributed to the Chinese alchemist Ko Hung. In the fourth Century AD, Ko Hung had developed a rotary lift spinning-top toy that was an early ancestor of the helicopter. In 1490, Leonardo Da Vinci drew the Helical Air Screw, a spiral shaped flying machine that was also a step along the path to the modern vertical take-off and landing (VTOL) vehicle.

Throughout the intervening centuries, further development of VTOL vehicles occurred with very little success because of the lack of a light weight powerful engine to drive the rotating blades of a VTOL. On Nov. 13, 1907, French inventor Paul Cornu's aircraft was the first to take off vertically with its pilot and make a free, albeit very short, flight. Like the Wright brother's first flight at Kittyhawk, this showed that VTOL vehicles were within reach. However, it was not until the mid-1940's when gyrotechnical and control mechanisms reached a sufficiently advanced stage of development to enable steady and smooth flights of any great distance.

During the 1950's the helicopter became more common. The first extensive use of the helicopter came when it was adopted by the US military during the Korean War. The unique capabilities of the helicopter being able to take off and land vertically and without requiring runways made it an excellent transport vehicle ferrying the critically wounded from the front-line to the mobile army surgical hospitals behind the line.

While there are different types of VTOL vehicles other than the helicopter, the helicopter serves as an excellent example to explain the principles involved with vertical take off and landing flight. A helicopter has at least two wings, also called blades, attached to a main rotor. The main rotor is attached to a drive shaft that is connected to an engine of some sort. The engine powers the drive shaft and in turn spins the rotor blades. This spinning of the rotor blades creates lift by deflecting air downward and benefiting from the equal and opposite reaction that results. The rotary motion pushing the air much like a ceiling fan. Whereas a standard airplane requires horizontal motion to generate lift by air passing over its wings, the rotating helicopter blades account of the horizontal motion of the airplane. To prevent the helicopter from rotating with the spinning main rotor, the helicopter has a set of rotor blades affixed to the helicopter's tail. These act as an anti-torque mechanism stabilizing the aircraft and also enable further directional control. This tail rotor is directed in a horizontal plane and compensates for the spin of the helicopter. Horizontal motion is then achieved by varying the angle of attack of the rotor blades. This unique combination of vertical lift and horizontal control enables a helicopter to hover, move forwards, backwards and to its left and right depending on the command of the pilot.

A VTOL vehicle variation in the same family as the helicopter is the helicopter with two counter rotating main rotors on a common axis. The counter-rotating blades enable the VTOL to achieve higher speeds allow for greater control, agility and powerful maneuvering. They also counteract the spin that can occur in a traditional one rotor system without requiring a tail rotor to stabilize the aircraft. There is an additional advantage of eliminating noise caused by the tail rotor and its transmission. The two producers of this variety of helicopter have been Kamov and Sikorsky.

Further variations include such VTOL's as the Boeing Chinook and the Filper Beta. Both aircraft have two rotors for vertical takeoff and landing and no tail rotor. The Chinook is a huge troop transport that uses a separate turbine to power each rotor. The Filper Beta is a individual transport vehicle, best equated with a car, however they operate on similar principals. The two separate rotors are designed compensate for spin while varying the attack and the acceleration of the rotors enables the pilot to maneuver and fly the aircraft.

Another kind of vertical takeoff and landing vehicle is a hybrid of an airplane and a helicopter. The first successful attempt at this design was the Chance-Vought XC-142 tilt wing aircraft. This offered the vertical takeoff and landing ability of the helicopter while enabling the greater speed of fixed wing aircraft. The wing unit of the propeller driven aircraft tilted from standard airplane horizontal to the vertical for take off and landing. The V-22 Osprey is similar to the Chance-Vought however only the rotors tilt. The tilt-rotor Osprey also allows vertical take off and landing as well as high speed horizontal flight.

The prior technology of round wing aircraft includes both VTOL aircraft and aircraft with round wings that are used primarily for horizontal flight instead of VTOL. Rasmussen's round winged aircraft invention used two round wings, one on each side of the fuselage, to enhance horizontal propulsion. In the event of a power loss, blades could be extend from the two round wings that were to continue the wings' rotation and allow the aircraft to land safely. This prior art used the round wings to enable safe landings in the event of power loss.

Geddes developed an aircraft that has a pair of rotary wings for the generation of electrical power during flight. The wings were located on opposite sides of the fuselage and had raised vanes for catching wind resistance to cause the wings to spin during flight. The vanes for each wing were set opposite the other's configuration so that the wings would rotate in the opposite directions. This prior art used the rotation of the round wings to generate electrical power for the aircraft.

Gouin developed an aircraft that had two rotating discs for wings designed to facilitate vertical take off and landing of the aircraft. The two wings were located one on each side of the aircraft. The wings had vanes and were powered by synchronized turbine engines to rotate in opposite directions. While this aircraft uses round wings for the purpose of vertical take off and landing, it nonetheless, requires two wings located with one wing on each side of the aircraft. The aircraft uses other propulsion means for horizontal flight.

A more recent interpretation of the round winged VTOL aircraft is proposed by Vass. Vass uses a fixed round wing containing an impeller that forces air downward giving the aircraft its ability to take off and land vertically. For horizontal flight, the aircraft uses other propulsion means. A different embodiment shows the round wing impeller method for both take off and landing as a horizontal flight propulsion means by locating one round wing impeller unit on each side of the aircraft.

BRIEF SUMMARY OF THE INVENTION

The present invention herein is a disc shaped wing for a vertical take off and landing air vehicle with two wing segments, an inner disc and an outer disc each mounted on a coaxial rotor. The disc segments counter-rotate to enable vertical takeoff and landing and greater stability during horizontal flight. Horizontal flight is effected by a propulsion system. This propulsion system can be propeller, turbine propeller or jet air flow. It can also include a propulsion system heretofore unknown.

This invention combines the vertical take off and landing features of a helicopter with the benefits of a fixed wing aircraft. The structure of the invention enables the aircraft utilizing the wing to fly at higher speeds horizontally, while enabling the vertical take of and landing of helicopters. Once the aircraft has achieved flight, the invention allows the aircraft to fly like a glider. The aerodynamic structure of the rotating wing offers greater fuel resources and economically efficient. This essentially combines the best features of airplanes and helicopters.

The wing is made up of an inner disc and an outer disc. In one embodiment of the invention, the inner disc is comprised of two ring segments webbed by flap blades. The upper flap blades are attached to a squash plate assembly that allows them to open and close depending on whether the aircraft is in horizontal or vertical flight. The number of flaps can be greater than four. During horizontal flight the flaps remain tightly shut allowing for a smooth airstream surface. When the operator of the aircraft desires vertical takeoff and landing, the flaps are to be adjusted to the open position. The amount of vertical lift can be improved depending on the degree to which the flap blades are opened. The flap blades are attached to a pivot device along their internal side. This pivot device is off center to allow maximum opening of the flap for the greatest capable lift.

The outer disc is axially spanned by at least four internal rotator blades. These span from the drive shaft to the outer disc. These internal rotor blades are hollow and made up of a lightweight composite material and accommodate an equal number of retractable rotor blades contained inside their shells. The lower blades are contoured in an airfoil shape for greater lift enhancement. The extendable rotor blades are similarly contoured. The retractable rotor blades are extendable and retractable through the use of a jackscrew. A jackscrew drive mechanism extends the outer rotor blades for added lift during vertical takeoff and landing.

The advantages of this design over the prior art includes a greater versatility of vertical take-off, landing and hovering. This counter rotating round wing configuration provides greater lift and ease of maneuverability. The design also allows for slow speed and high speed flight. Another improvement over other vertical take off and landing vehicles design include a safety. If the aircraft should lose power, the unique shape of the wing will enable the aircraft to glide to a safe landing.

BRIEF DESCRIPTION OF THE SEVERAL VIEWS OF THE DRAWINGS

FIG. 1 is a side elevational view of the instant invention incorporated into an aircraft.

FIG. 2 is a perspective view showing structure and relation of the upper flap blades with the lower blades with the external portions.

FIG. 3 is a perspective view showing layers of the of the instant invention and noting the placement of the control mechanism drawn in FIG. 6.

FIG. 4 is a perspective view of the instant invention incorporated into a helicopter showing the opening of the upper flap blades.

FIG. 5 is a side view of the control mechanism for the upper flap blades.

FIG. 6 is a side view of the lower blade extension control mechanism.

FIG. 7A is a side view of a first embodiment of the upper flap blade control mechanism.

FIG. 7B is a side view of a second embodiment of the upper flap blade control mechanism.

DETAILED DESCRIPTION OF THE INVENTION

The present invention herein is a disc shaped wing 10 comprised two disc segments, an inner disc assembly 48 and an outer disc assembly 60, that counter-rotate to enable vertical take off and landing. The wing shape and counter-rotation also imparts greater stability and lift for horizontal flight.

Figure 9:
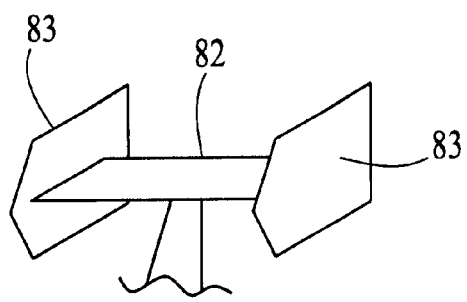
FIG. 9 is a perspective view of an alternate embodiment of the aircraft tail section depicted in FIG. 1 and FIG. 4.

FIG. 1 is a side elevational view of the instant invention incorporated into an aircraft. FIG. 1 depicts the fuselage 1, the landing gear wheel 2, the cockpit 4, and the windshield to the cockpit 3. Because of the nature of the counter rotating wings 10, there is no need for a tail rotor to prevent unwanted torque spin. The aircraft embodied in FIG. 1 and FIG. 4 has a tail fin 80 with tail flats 81 for providing lift and control. An alternate embodiment is depicted in FIG. 9 can allow for a longer tail flat 82 with stabilizer tail flat end plates 83.

FIG. 1 also depicts the horizontal propulsion system 5 as a forced air jet. The horizontal propulsion system can also be propeller driven. The circular wing assembly 10 is attached to the aircraft by way of the drive shaft assembly 15. The drive shaft assembly 15 is in turn attached power source 20 that powers the individual counter rotating drive shafts. The drive shaft assembly 15 contains an inner shaft 50, an outer shaft 17, and a support shaft 16, depicted in FIG. 6. The drive shaft assembly 15 is powered by a power source 20 contained in the aircraft fuselage 1. The power source can also be the same power source that drives the engines for horizontal flight.

The circular wing assembly 10 shown in perspective view in FIG. 2 and FIG. 3 shows the structure and relation of the upper flap blades 25 with the lower blades 30, that contain the retractable blades 35. A plurality of upper flap blades 25 are clearly depicted in FIG. 3 as would surround the support rods. FIG. 3 also depicts the inner disc assembly 48 without the upper flap blades, showing the relation of the support rods 45 with the inner disc hub 46 and the inner disc ring 47. The support rods 45 provide the skeletal structure joining and supporting the inner disc hub 46 to the inner disc ring 47.

The upper flap blades 25 with the inner disc assembly 48 are driven to spin in one direction by inner drive shaft 50 while the outer disc assembly 60 and the lower blades 30 are driven to spin in the opposite direction by outer drive shaft 17. This is achieved through multiple hollow, concentric, rotating coaxial shafts in the drive shaft assembly 15.

FIG. 5 depicts the squash plate assembly 40 for rotatably turning the support rods 45, thereby opening the upper flap blades and adjusting their angle of attack. In FIG. 5, this squash plate assembly 40 adjusts the support rods 45 connected to the upper flap blades 25 of the inner disc assembly 48 and enables the upper flap blades 25 to open and close. The squash plate assembly is powered by electric servos. The servos act on the squash plate assembly actuation arm 41 of FIG. 5, acting on the support rods 45 and thereby opening and closing the upper flap blades 25.

FIG. 3 depicts the general position of the upper flap blades 25 in relation to the squash plate assembly 40. The upper flap blades 25 span the inner disc hub 46 and the inner disc ring 47. This inner disc assembly 48 is seated in the outer disc well 63. The inner disc assembly is attached to and driven to rotate by the inner drive s haft 50 that rises up through the concentric drive shafts of the drive shaft assembly 15.

Depicted in FIGS. 4 and 7, the top flap blades 25 are attached to the support rods 45 that govern the opening and closing and support. The support rods 45 are group articulated for the uniform pivoting of the upper flap blades 25. This upper flap blade 25 section is powered by the inner drive shaft 50 rising through the center of the outer drive shafts that power the lower blades 30.

The surface of the outer disc assembly 60 comprises outer disc panels 61 curved in an airfoil shape. This outer disc assembly 60 is made up of a outer disc hub 65 located about the drive shaft assembly 15 and fixably attached to the outer drive shaft 17. The outer disc hub 65 and the outer disc ring 66 are fixably spanned by at least four lower blades 30 from the outer disc hub 65 radially to the outer disc assembly 60.

During take off and landing, the lower blades 30 of the outer disc assembly 60 also generate lift through the rotational spinning of the outer disc assembly 60. Retractable blades 35 are sheathed inside these lower blades 30. These retractable blades 35 are driven out beyond the edge of the outer disc assembly 60 by an extension means 36, such as a jack screw, connected to a retractable blade extension mechanism 37, such as a servo or electric motor. These retractable blades 35 offer increased lift for the aircraft during vertical take off and landing. During horizontal flight these retractable blades 35 are retracted inside the lower blades 30 to provide a smooth edged airfoil for the outer disc assembly 60. The upper flap blades 25 shown in FIG. 3 are driven by the concentric coaxial drive shaft mechanism depicted in FIG. 6.

During take off and landing the upper flap blades 25 are open to provide the lift for vertical take off. During horizontal flight, these upper flap blades 25 are closed and shut flat to provide an airfoil stream of little resistance to allow greater flight speed than achievable from common VTOL vehicles such as helicopters.

In one embodiment, the retractable blades 35 pierce the outer disc assembly 60 through a blade port 62. When retracted for horizontal flight, the retractable blades 35 are substantially withdrawn inside the outer disc assembly 60. In a further embodiment of the invention, the outer edge of the retractable blades 35 have perpendicular retractable blade end plates 38 that close off the lower blade port 62, thereby enabling a contiguous substantially smooth surface on the outer disc assembly 60 and preventing drag and wind resistance. FIG. 6 depicts the retractable blade extension mechanism 37 and the extension means 36 for extending the retractable blades 35.

Figure 8:
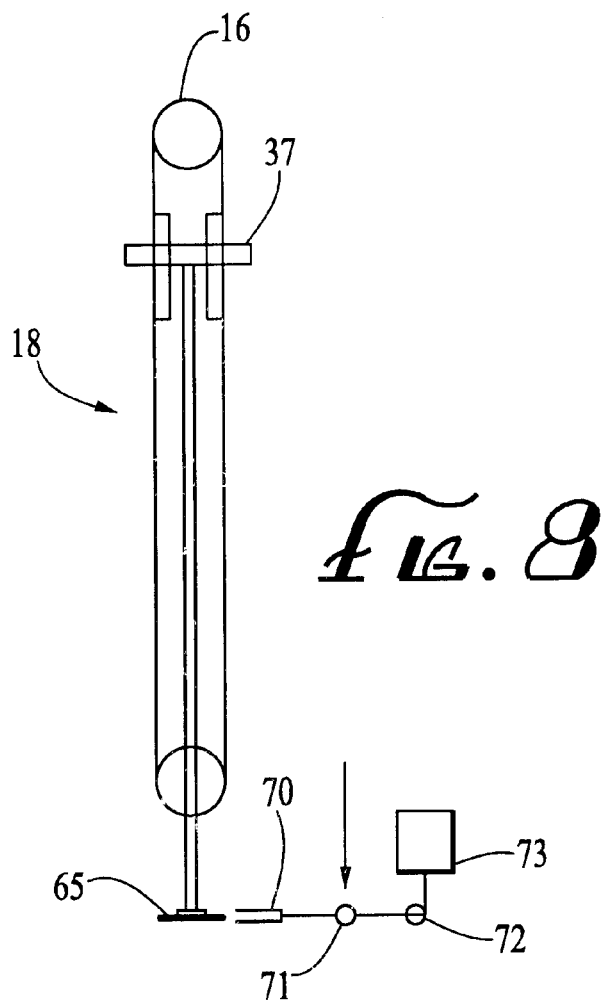
FIG. 8 is a side view of the T-Bar and extension means for driving the squash plate.

FIG. 5 depicts the squash plate assembly 40 for controlling the aperture of the upper flap blades 25. This diagram shows a cut-away of the support rod 45 attached to the squash plate assembly 40. FIGS. 7A and 7B depict two embodiments of the support rod placement in flap blades 25. The preferable embodiment shown in 7A depicts the support rod 45 as being off center of the upper flap blades 25 to which it is attached. This off center orientation allows for greater opening of the upper flap blades 25. This enables greater movement of air over the wing creating greater lift. This support rod 45 placement accommodates the tear shaped airfoil pitch while enabling the entire disc shaped wing to have a slimmer profile. FIG. 8 depicts the hollow rotating drive shaft 18 with control bar unit 39 for driving the squash plate assembly 40. This figure also depicts the bearing 65 and shift fork 70 that actuate the control bar unit 39.

It is understood that each of the elements described above, or in combination may have useful application in other types of machines differing from the type described above.

While certain novel features of this invention have been shown and described here and in the attached claims, it is not intended to be limited to the details above, since it will be understood that various omissions, modifications, substitutions, and changes in the forms and details of the device illustrated and in its operation can be made by those skilled in the art without departing in any way from the spirit of the present invention.

What is claimed is:

1. A counter rotating wing for an air vehicle having a circular shape comprising:
   an inner disc assembly and a counter rotating outer disc assembly, said inner disc assembly and said outer disc assembly secured about a central drive shaft assembly;
   said drive shaft assembly having a top end and a bottom end, said bottom end engaging a power source;
   said drive shaft assembly comprising a plurality of coaxial counter rotating drive shafts;
   said inner disc assembly, having an inner disc hub, an inner disc ring, and a plurality of support rods spaced an equal distance from each other;
   each of said support rods having a first end and a second end, said first end of each said support rods secured to said inner disc hub and extending radially therefrom and substantially perpendicular to said drive shaft assembly;
   each of said second ends of said support rods connected to said inner disc ring;
   a plurality of flap blades fixed about said support rods, and capable of pivoting about said support rods to open to create lift for vertical take off and landing and capable of closing to produce a substantially contiguous surface during horizontal flight,
   said outer disc assembly, having an outer disc hub and an outer disc ring, said outer disc hub and said outer disc ring being spanned by a plurality of equally spaced support members fixably attached to said outer disc hub and outer disc ring;
   said outer disc assembly having an outer disc well located between said outer disc hub and outer disc ring for receiving said inner disc assembly,
   said outer disc assembly having a plurality of lower blades, said lower blades each encasing a retractable blade member capable of extending during take off and landing for creating greater lift;
   said retractable blades connected to a retractable blade extension mechanism.

2. A circular wing as receipted in claim 1, wherein each said upper flap blade has a support rod spanning said inner hub and said inner ring, said support rod slightly off center to allow expanded opening of the upper flap blades for greater lift during take off and landing.

3. A circular wing as receipted in claim 2, wherein each said retractable blade pierces said outer disc assembly through a blade port opening.

4. A circular wing as receipted in claim 3, wherein each said retractable blade has a retractable blade end plate to cover over the blade port opening in said outer disc assembly.

5. A circular wing as receipted in claim 1, wherein each of said plurality of support members comprises a lower blade through which said retractable wings extend in and out.

6. A circular wing as receipted in claim 5, wherein each said upper flap blade has a support rods spanning said inner hub and said inner ring, said support rods slightly off center to allow expanded opening of the upper flap blades for greater lift during take off and landing.

7. A circular wing as receipted in claim 6, wherein each said retractable blade pierces said outer disc assembly through a blade port opening.

8. A circular wing as receipted in claim 7, wherein each said retractable blade has a retractable blade end plate to cover over the blade port opening in said outer disc assembly.

9. A counter rotating wing for an air vehicle having a circular shape comprising:

- an inner disc assembly and a counter rotating outer disc assembly, said inner disc assembly and said outer disc assembly secured about a central drive shaft assembly;
- said drive shaft assembly having a top end and a bottom end, said bottom end engaging a power source;
- said drive shaft assembly comprising a plurality of coaxial counter rotating drive shafts;
- said inner disc assembly, having an inner disc hub, an inner disc ring, and a plurality of support rods spaced an equal distance from each other;
- each of said support rods having a first end and a second end, said first end of each said support rods secured to said inner disc hub and extending radially therefrom and substantially perpendicular to said drive shaft assembly;
- each of said second ends of said support rods connected to said inner disc ring;
- a plurality of flap blades fixed about said support rods, and capable of pivoting about said support rods to open to create lift for vertical take off and landing and capable of closing to produce a substantially contiguous surface during horizontal flight;
- said support rod is slightly off center to allow expanded opening of the upper flap blades for greater lift during take off and landing;
- said outer disc assembly, having an outer disc hub and an outer disc ring, said outer disc hub and said outer disc ring being spanned by a plurality of equally spaced support members fixably attached to said outer disc hub and outer disc ring;
- said outer disc assembly having an outer disc well located between said outer disc hub and outer disc ring for receiving said inner disc assembly,
- said outer disc assembly having a plurality of lower blades, said lower blades each encasing a retractable blade member capable of extending during take off and landing for creating greater lift;
- said retractable blades connected to a retractable blade extension mechanism.

10. A circular wing as receipted in claim 9, wherein each said upper flap blade has a support rod spanning said inner hub and said inner ring, said support rod slightly off center to allow expanded opening of the upper flap blades for greater lift during take off and landing.

11. A circular wing as receipted in claim 10, wherein each said retractable blade pierces said outer disc assembly through a blade port opening.

12. A circular wing as receipted in claim 11, wherein each said retractable blade has a retractable blade end plate to cover over the blade port opening in said outer disc assembly.

13. A counter rotating wing for an air vehicle having a circular shape comprising:

- an inner disc assembly and a counter rotating outer disc assembly, said inner disc assembly and said outer disc assembly secured about a central drive shaft assembly;
- said drive shaft assembly having a top en d and a bottom end, said bottom end engaging a power source;
- said drive shaft assembly comprising a plurality of coaxial counter rotating drive shafts;
- said inner disc assembly, having an inner disc hub, an inner disc ring, and a plurality of support rods spaced an equal distance from each other;
- each of said support rods having a first end and a second end, said first end of each said support rods secured to said inner disc hub and extending radially therefrom and substantially perpendicular to said drive shaft assembly;
- each of said second ends of said support rods connected to said inner disc ring;
- a plurality of flap blades fixed about said support rods, and capable of pivoting about said support rods to open to create lift for vertical take off and landing and capable of closing to produce a substantially contiguous surface during horizontal flight;
- said support rod is slightly off center to allow expanded opening of the upper flap blades for greater lift during take off and landing;
- said outer disc assembly, having an outer disc hub and an outer disc ring, said outer disc hub and said outer disc ring being spanned by a plurality of equally spaced support members fixably attached to said outer disc hub and outer disc ring wherein each of said plurality of support members comprises a lower blade;
- said outer disc assembly having an outer disc well located between said outer disc hub and outer disc ring for receiving said inner disc assembly,
- said outer disc assembly having a plurality of lower blades, said lower blades each encasing a retractable blade member capable of extending during take off and landing for creating greater lift;
- said retractable blades connected to a retractable blade extension mechanism.

14. A circular wing as receipted in claim 13, wherein each said retractable blade pierces said outer disc assembly through a blade port opening.

15. A circular wing as receipted in claim 14, wherein each said retractable blade has a retractable blade end plate to cover over the blade port opening in said outer disc assembly.

* * * * *